United States Patent [19]

Altus

[11] Patent Number: 4,758,457
[45] Date of Patent: Jul. 19, 1988

[54] FLOOR MAT WITH INTEGRAL RETAINER MEANS

[75] Inventor: Mark Altus, Huntington Woods, Mich.

[73] Assignee: The 2500 Corporation, Birmingham, Mich.

[21] Appl. No.: 17,708

[22] Filed: Feb. 24, 1987

[51] Int. Cl.$^4$ .............................. B32B 3/06; B60J 9/00
[52] U.S. Cl. ........................................ 428/82; 428/85; 428/86; 428/99; 428/122; 428/126; 428/131; 428/137; 428/223; 428/100
[58] Field of Search ...................... 428/85, 95, 47, 78, 428/82, 86, 99, 100, 122, 126, 223, 131, 137

[56] References Cited

U.S. PATENT DOCUMENTS

| 4,361,610 | 11/1982 | Roth | 428/95 |
| 4,382,986 | 5/1983 | Reuben | 428/95 |
| 4,399,176 | 8/1983 | Bell | 428/85 |
| 4,481,240 | 11/1984 | Roth | 428/95 |
| 4,588,628 | 5/1986 | Roth | 428/95 |
| 4,673,603 | 6/1987 | Roth | 428/95 |

Primary Examiner—Marion C. McCamish
Attorney, Agent, or Firm—Gifford, Groh, VanOphem, Sheridan, Sprinkle and Dolgorukov

[57] ABSTRACT

There is disclosed an automotive floor mat having an integral retainer with retaining means provided substantially over the entire underside thereof mounted to a piece of automotive carpet which, in the preferred embodiment has only the scrim and tuftlock layers, with the bottom layer of latex (or other material) being eliminated, and thus being much lighter than previous constructions.

35 Claims, 3 Drawing Sheets

U.S. Patent   Jul. 19, 1988   Sheet 3 of 3   4,758,457
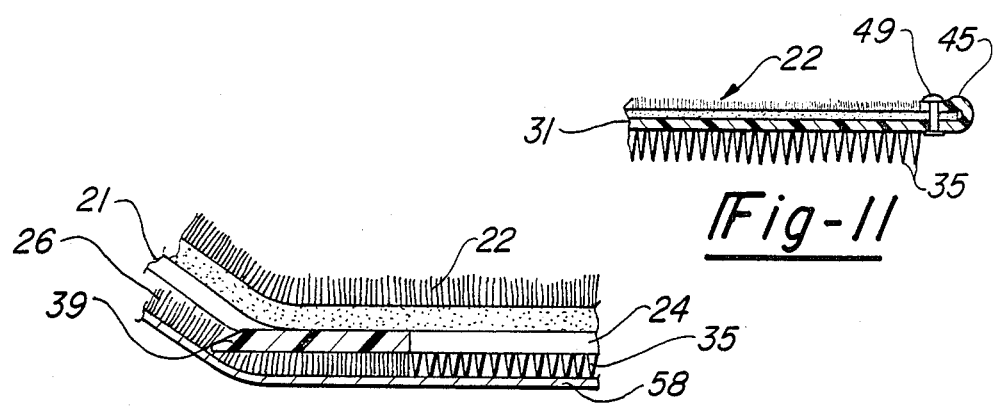
Fig-11
Fig-9
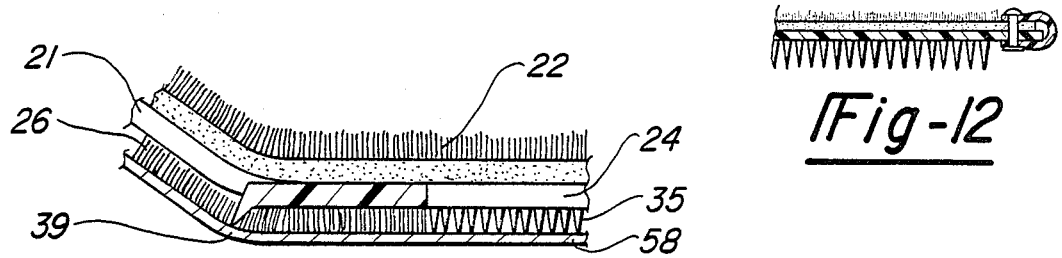
Fig-10
Fig-12
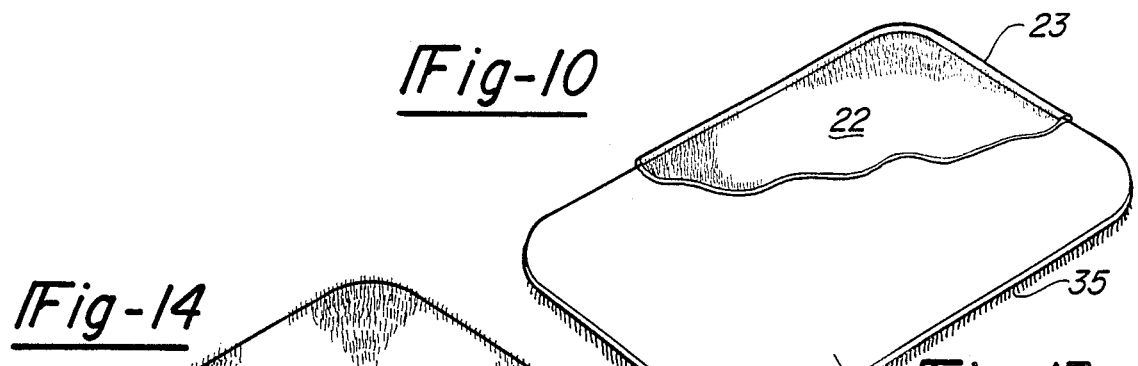
Fig-13
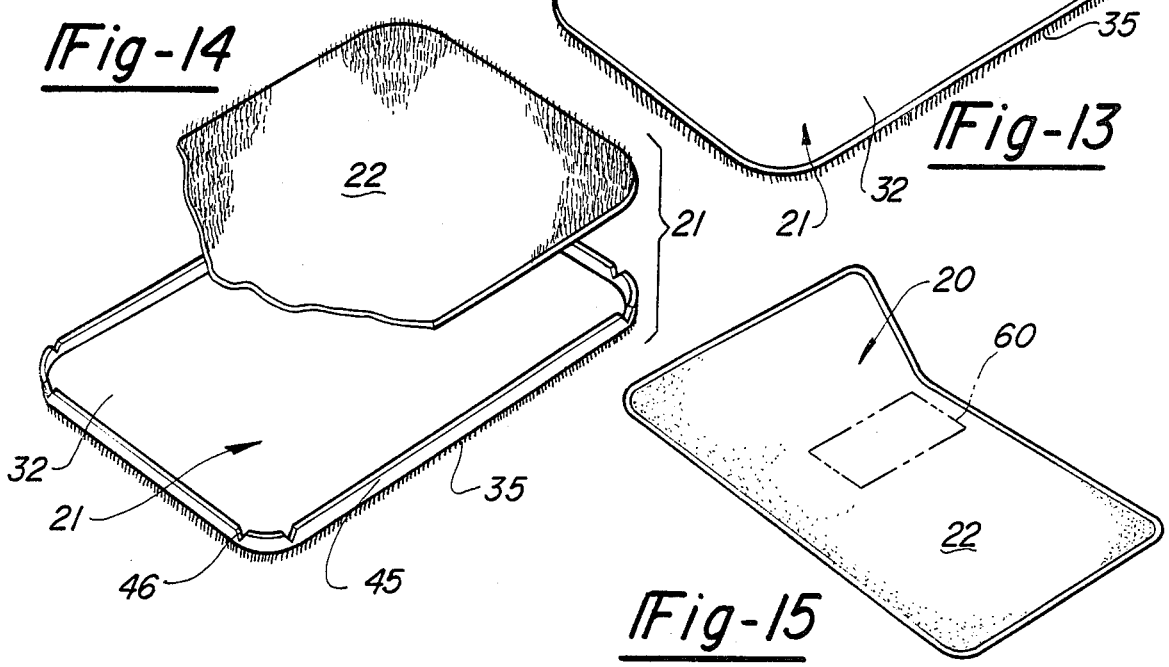
Fig-14
Fig-15

FLOOR MAT WITH INTEGRAL RETAINER MEANS

BACKGROUND OF THE INVENTION

1. Field of The Invention

The present invention relates to floor mats for use in passenger carrying vehicles, and more particularly to floor mats intended for use in automotive type vehicles. The improvements disclosed in the present application relate to a floor mat with integral retainer means which is much lighter than previous floor mats by virtue of its construction, but still is able to prevent movement of the floor mat when installed in a motor vehicle.

2. Description of The Prior Art

A review of the prior art involving automotive floor mats will show that there are three main areas of concern to the designers of such products. These are the need to cut costs due to ever increasing price pressures on automotive suppliers due to foreign competition; the need to continually cut the weight of automotive floor mats due to the pressures on auto makers to improve fuel economy; and, the need while cutting price and weight to effectively retain the floor mat on the automotive carpet. The efforts of myself and other employed by Applicant's assignee show the tremendous amount of work that has been put forth in this field. These efforts started as early as March of 1980, and resulted in the issuance of U.S. Pat. No. 4,361,610, continued with the filing of application Ser. No. 06/444,986, and culminated with the issuance of U.S. Pat. No. 4,588,628 before I myself became involved with this work. The floor mat disclosed and claimed in U.S. Pat. No. 4,588,628, which is the closest prior art of which I am aware, is a double sided floor mat with detachable, rotateable, retainer means of a particular construction, which is very effective in retaining such a floor mat on an automotive carpet.

However, such floor mats have proven to be rather heavy, and rather expensive to manufacture. It was thought that one of the varieties of floor mats claimed in said U.S. Letters Patents would suffice if further reductions in weight would have to be made. This is the floor mat which is claimed with carpeting on only one side and a retainer with bristles on only one side. However, even though there was a saving in weight, the solution was unsatisfactory, because without bristles on the top side of the retainer acting on the carpeting on the bottom of the retainer, the retainer was free to slip relative to the floor mat for a short distance, which gave an annoying and dangerous slipping feeling when the passenger was first entering the vehicle, and because of this slippage, the tabs on the retainer started to show damage because of the strain put on them from the slipping action.

Because of this problem, such solution was not accepted by the automakers, and much additional work and invention had to take place before a satisfactory solution was arrived at. The inventions which have been made are claimed and disclosed in the present application, and in a previous application in which T am the inventor entitled "Light Weight Floor Mat with Retainer Means".

SUMMARY OF THE INVENTION

In order to save weight, and at the same time avoid the slippage problems of the aforementioned single sided retainer, I have developed an integral retainer having retaining means substantially over the entire under side thereof, and into which a piece of automotive carpet is mounted which, in the preferred embodiment has only the scrim and tuftlock layers, with the bottom layer of laytex (or other material) being eliminated, thus saving a great deal of weight.

Thus, it is an object of the invention to provide an improved light weight floor mat which will remain in place during operation of a motor vehicle, as well as during entry and exit of occupants of said motor vehicle.

A further object of the present invention is to provide an improved floor mat which is easily removeable and replaceable on the floor of a motor vehicle.

A further object of the present invention is to provide an improved, light weight, nonskid floor mat having integral retaining means forming the bottom thereof.

A still further object of the present invention is to provide for the use of a lighter weight carpet in my floor mat construction by virtue of the opportunity to eliminate the bottom layer of laytex (or similar material) found on normal carpets.

Further objects and advantages of the present invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 9 is a sectional view, taken in the direction of the arrows, along the section line 9—9 of FIG. 4.

FIG. 10 is a modification of the construction shown in FIG. 9.

FIG. 11 is a view in large part similar to FIG. 6, showing the carpet riveted in place.

FIG. 12 is a view similar in large part to FIG. 3, showing the edge binding riveted in place.

FIG. 13 is a perspective view, partially cut away, of the construction shown in FIG. 1 applied to a rear floor mat.

FIG. 14 is an exploded perspective view, partially cut away, showing the construction of FIG. 4 applied to a rear floor mat.

FIG. 15 is a perspective view of a front floor mat made according to the construction shown in FIG. 1 or FIG. 4 with the bristles removed where the floor mat is to cover a heel pad found in automotive carpeting.

It is to be understood that the present invention is not limited to the details of construction and arrangement of parts illustrated in the accompanying drawings, since the invention is capable of other embodiments, and of being practiced or carried out in various within the scope of the claims. Also, it is to be understood that the phraseology and terminology employed herein is for the purpose of description, and not of limitation.

Figure 1:
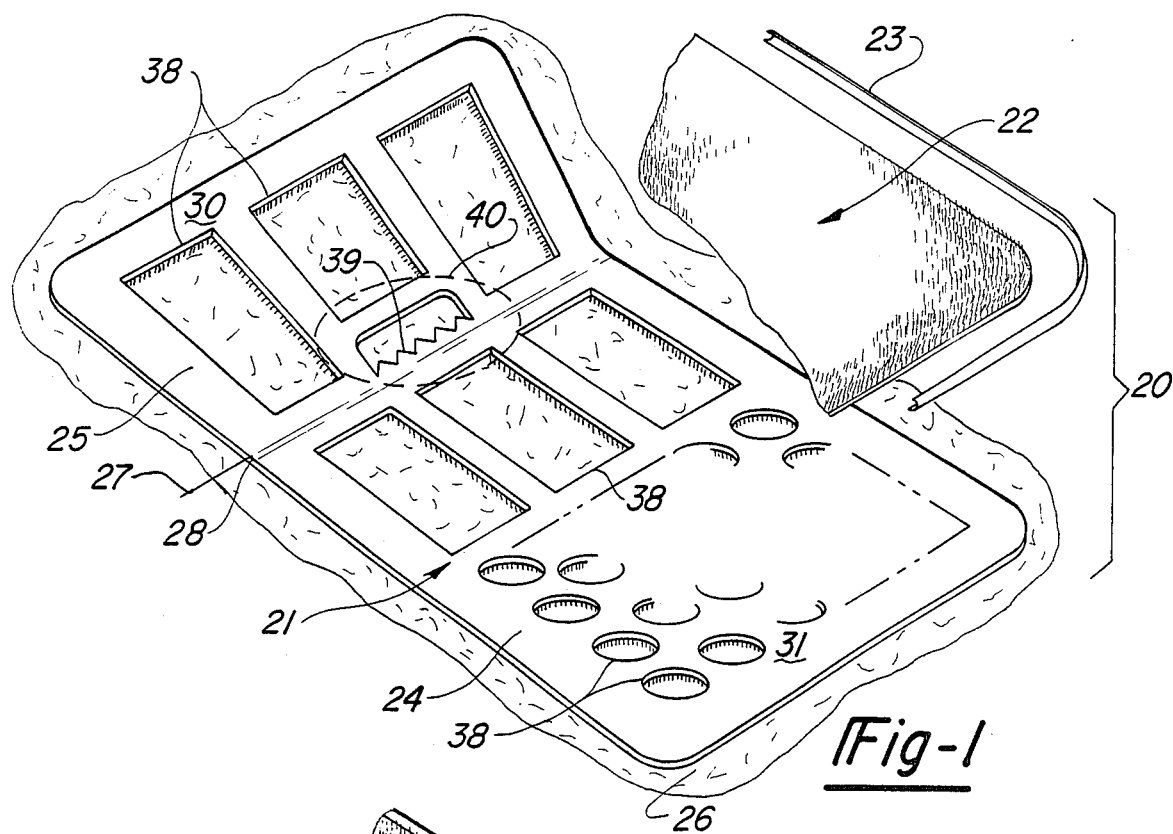
FIG. 1 is an exploded perspective view of a floor mat construction embodying the present invention.
Figure 2:
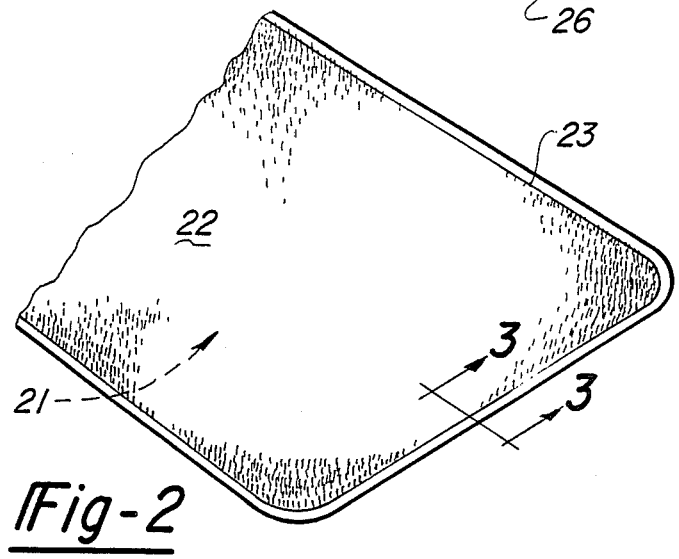
FIG. 2 is a partial perspective view of the construction shown in FIG. 1 when assembled.
Figure 3:
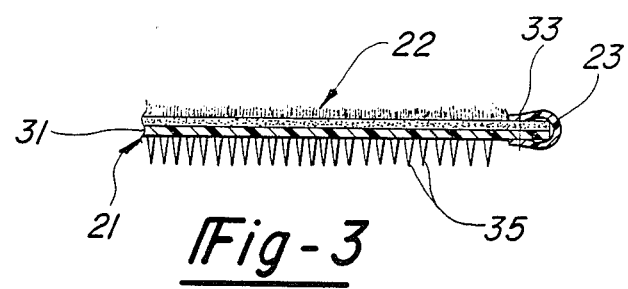
FIG. 3 is a sectional view, taken in the direction of the arrows, along the section line 3—3 of FIG. 2.

Referring now to FIGS. 1-3, there is shown one embodiment of the present invention. There is shown in FIG. 1 an automotive floor mat generally designated by the numeral 20, which includes a retainer, generally desiganted by the numeral 21, a piece of carpet generally designated by the numeral 22, and an edge binding 23.

The retainer 21 consists of two portions, the heel portion 24, so named because this is the portion on which the occupants heel rests during operation of a motor vehicle, and the toe portion 25, so named because it is the portion which rests up against the toe board of the automobile. Of course, in the modern day automobile, the toe board or toe pan is covered with automotive carpet 26, as is the floor pan, on which the heel portion of the retainer rests. In order to facilitate conforming to the shape of the floor pan and toe pan of the automobile, the retainer 21 may be formed with a crease along the toe line 27. To facilitate this, a living hinge 28 may be provided, or other means well known in the art may be used.

Whether or not a living hinge 28, or other type of hinge means are provided along the toe line 27, the retainer 21 will consist of a toe portion 25 having a first planar surface 30 with bristles 35 downwardly depending therefrom to form a lower bristled surface. The heel portion 24 will consist of a second planar surface 31 having bristles 35 depending downwardly therefrom. Of course, if the a floor mat construction is intended to be used on a flat surface, such as will be discussed later concerning FIGS. 13 and 14, only a single planar surface will be present.

In the construction shown in FIGS. 1-3, a piece of automotive carpet 22, substantially identical in size to the retainer 21, is placed thereon, with an edge binding 23 placed about the entire perimeter and stitched in place to bind the carpet 22, the retainer 21, and the edge binding 23 to each other. The stitching, using thread well known in the automotive art, is shown at 33. It can be seen that the lower bristled surface of the heel portion 24 of the retainer 20 is formed by bristles 35 depenidng downwardly from the second planar surface 31.

Figure 8:
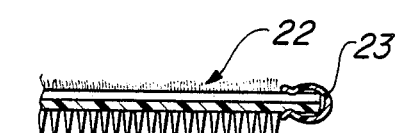
FIG. 8 is a view similar in large part to FIG. 3, but representative of several other means of attaching the edge binding to the carpet and retainer such as heat sealing, sonic welding or adhesive bonding.

It should be understood that it is possible to attach the edge binding 23 to the carpet 22 and the retainer 21, in a wide variety of ways. FIG. 8, for example, is representative of the use of heat sealing, sonic welding or adhesive bonding to bind the construction together. FIG. 12 shows riveting the edge binding 23 to the carpet 22 and retainer 21. As can be seen, any practicable method can be used.

The length and sharpness of the bristles are a matter to be selected by experimentation depending on the particular application to which the floor mat is to be put. For example, if the floor mat 20 is to be used in an automotive vehicle with a loop pile carpeting, the loop pile gives a better grab, and shorter and/or duller bristles are permissable. If cut pile carpet is to be used, the bristles should be sharper, with the sharpness of the bristles in this case being more important than the length. Also, the shape of the particular automotive floor pan and toe pan will have a bearing on the selection of bristles, and the lower bristled surface of either the heel portion 24, or the toe portion 25, or both, may have a portion of the lower bristled surface tapered if necessary.

If a mat is to be of rather large size, the bristles should be longer and sharper for more gripping, while a small mat does not need as long a bristle. Regardless of the particular application to which the floor mat is to be put, the bristles 35 forming the lower bristled surface should be no longer than $\frac{1}{2}$ to $\frac{3}{4}$ of the length of the automotive carpet 26 found in the vehicle.

In certain applications, it has been found desirable to place a saw tooth portion 39 proximate the front edge of the heel portion of the retainer to prevent the retainer 21 from riding up on the toe pan of the motor vehicle. In this case the bristles are removed from an area 40 around the saw tooth portion 39 to make the saw tooth portion effecitve, and a floor mat 20 having a saw tooth portion on the retainer will have the bristles removed proximate the saw tooth portion 39 as well as proximate the fastening means such as the edge binding 23. It is to be noted that a plurality of mass reduction openings 38 are provided in both the heel portion 24 and the toe portion 25 of the retainer 21. The amount of area which can be removed by these mass reduction openings again depends on the particular application to which the floor mat 20 is to be put. It has been found that the lower bristled surface should comprise from $\frac{1}{2}$ to 100% of the area covered by the retainer, depending on application, to give satisfactory retention.

Figure 4:
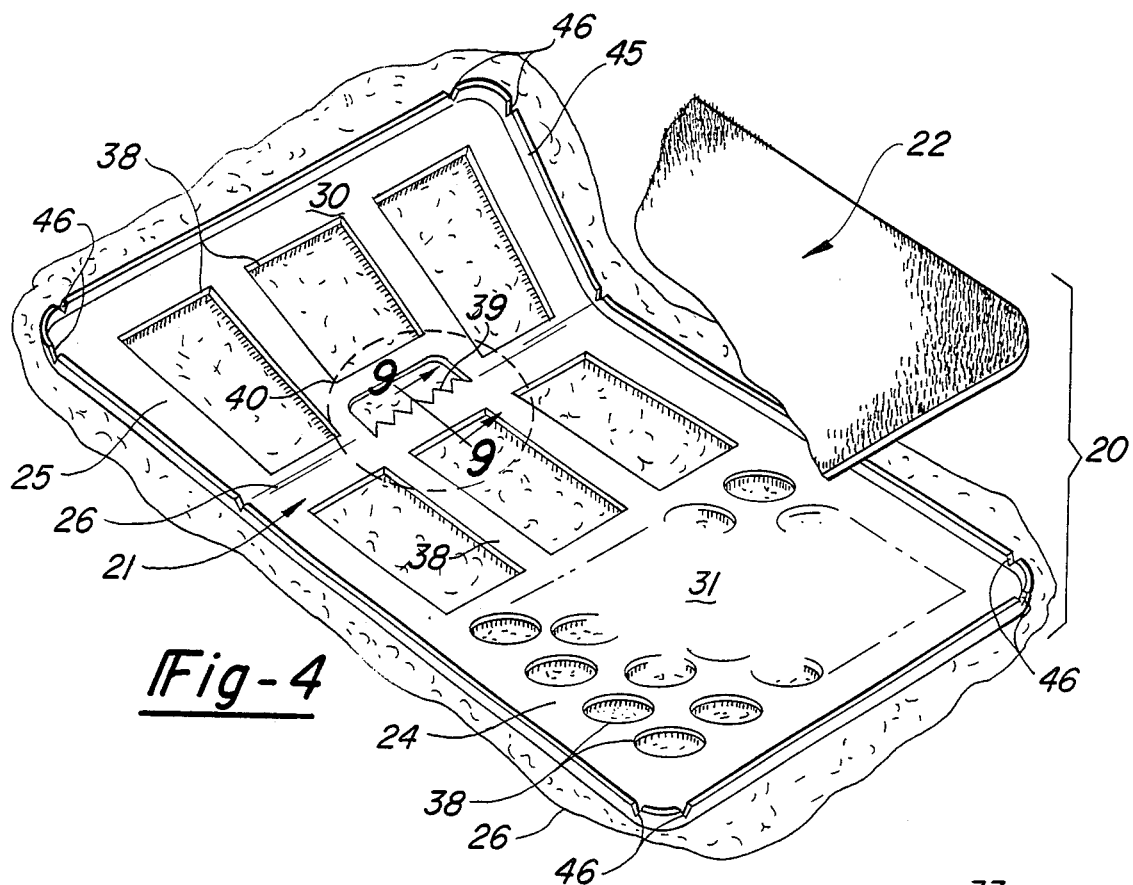
FIG. 4 is an exploded perspective view showing a modified construction embodying the present invention.
Figure 5:
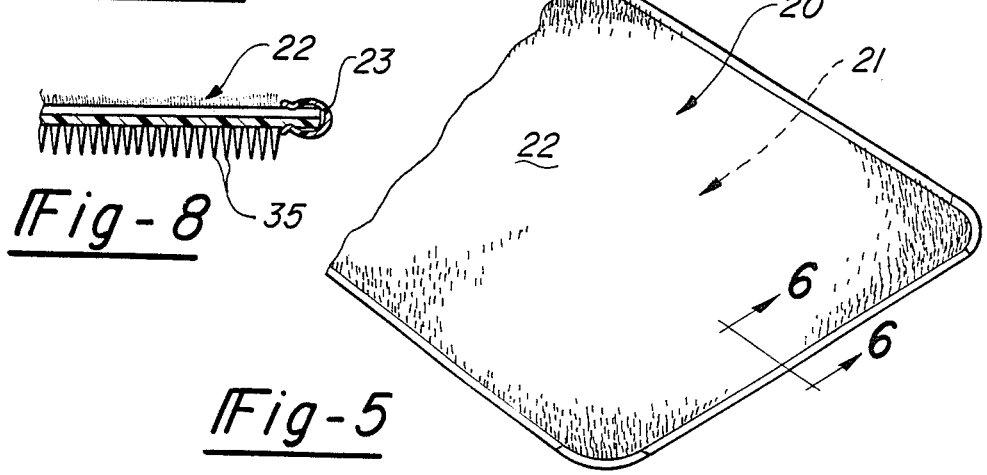
FIG. 5 is a partial perspective view showing the floor mat construction of FIG. 4 in its assembled condition.

A modification of my invention is shown in FIGS. 4 and 5. The construction shown in FIG. 4 is similar in many respects to that shown in FIG. 1. A retainer, generally designated by the numeral 21, is provided, to which is attached a piece of carpet 22 of substantially the same size as the retainer. The retainer again has a toe portion 25, and a heel portion 24, separated by a (real or imaginary) toe line 27, which again may have a living hinge or other hinge means provided there along to facilitate the floor mat 20 conforming to the shape of the floor pan of the automobile, thus, again separating the retainer into a first planar surface 30, and a second planar surface 31. If the retainer is to be used on a flat surface, the first planar surface 30 and the second planar surface 31 would merge into a single planar surface 32. As before, mass reduction openings 38 may be provided, as can the saw tooth portion 39. Again, the bristles 35 forming the lower bristled surface will depend downwardly from the second planar surface 31 of the heel portion 24 of the retainer 21, and from the first planar surface 30 of the toe portion 25 of the retainer. The bristles will not be found proximate the saw tooth portion 39, or the integral fastening means 42, which will now be described.

Figure 6:
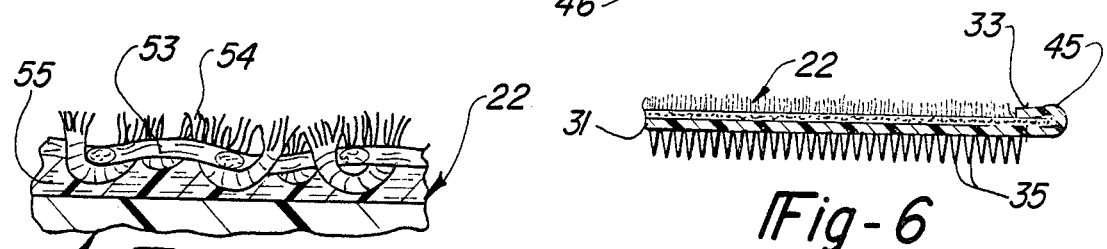
FIG. 6 is a sectional view, taken in the direction of the arrows, along the section line 6—6 of FIG. 5.

The integral fastening means 42 found in this modification of my invention comprises a lip 45 formed substantially continuously around the perimeter of the retainer 21 and depending upwardly from the first planar surface 30 and the second planar surface 31. The lip 45 is continuous except for a plurality of forming breaks 46 which allow the lip to be folded over onto the top of the planar surfaces 31 and 32 to securely hold the carpet 22 in place as shown in FIG. 6. The lip 45 may be folded down approximately 90° to hold the carpet 22 in place, and may be aided by means of stitching 33. A heat seal (not shown) may also be used or, as shown in FIG. 11, a rivet type construction may be used whereby rivets 49 are passed through the lip 45 and the heel portion 24 of the floor mat 21 to securely hold the carpet 22 in place. As before, any practicable method of attachment may be used.

Figure 7:
FIG. 7 is an enlarged view of a portion of FIG. 6.

Having now explained the basic construction of my floor may 20, it can now be understood why a large weight savings is possible. While I have thus far illustrated my invention using a conventional piece of automotive carpet 22, and by conventional I mean one having a scrim layer 53 into which are tufted a plurality of loops which are then severed to form the upwardly extending severed loops 54, with these loops then bound to the scrim layer 53 by a bonding layer 55, and then having a laytex (or similar) layer (not shown placed on the back thereof to give the carpet anti slip properties and durability. By reference to FIG. 7, it can be seen that the carpet 22 is now made in a manner which has the scrim layer 53 with the upwardly extending severed loops 54 locked in place with a bonding layer 55, but there is a notable absence of the laytex layer. This is because the laytex layer is no longer needed for durability, since the bonding layer 55 will directly contact the retainer 21, nor is the laytex layer needed to give the carpet non-skid properties, because it no longer contacts the automotive carpet 26 directly.

The significant weight saving in my construction comes from the fact that the laytex layer which is eliminated is a heavy rubber construction which weighs substantially more than the entire retainer 21 which is made of a polyethelyne, or similar plastic material, which is very light weight. It is estimated that for an average front set of floor mats the saving in weight can be as much as 1½ pounds, and for a full set of four floor mats the weight saving using the construction of the present invention can be as high as two pounds, thus making a significant weight savings over present retainers, and keeping the weight of the entire set of retainers under 3 pounds, which means it does not have to be counted in the weight of the car for EPA fuel economy pruposes. This is a significant advance in the automotive floor mat art. While conventional carpet can be used in my construction, in the preferred embodiment, the carpet 22 will not have the laytex layer to give the benefit of the weight saving.

Referring now to FIGS. 9 and 10, the importance of the saw tooth portion 39 of the retainer 21 can be seen. Proximate the front edge of the heel portion 24 of the retainer 21 is a saw tooth portion 39 which, in Figure 9, is planar with the heel portion 24 of the retainer. If the floor mat 20 tries to ride up the carpet 26 which is on top of the floor pan 58, the saw tooth portion 39 will dig into the carpet 26, blocking the lifting of the retainer. This saw tooth portion 39 may be planar with the heel portion 24, or as shown in FIG. 10, may extend downwardly therefrom.

Referrring now to FIGS. 13 and 14, there are shown the constructions shown in FIGS. 1 and 4 respectively adapted for use in rear floor mats. In this situation, for purposes of illustration, there will be a single planar surface 32 having bristles depending downwardly therefrom except proximate the fastening means, which in this illustration takes the form of edge binding 23, which secures the carpet 22 to the retainer 21. In FIG. 14, there is shown a retainer 21 having a single planar surface 32 having a lip 45 depending upwardly therefrom, and the bristles 35 forming the lower bristled surface depending downwardly therefrom. The carpet 22 is inserted into the retainer 21, the lip 45 is folded over approximately 90° as previously described in connection with the construction shown in FIG. 4, and the lip, if desired, is fastened to the floor mat construction by stitching, heat sealing, riveting, or the like to form the improved floor mat of the present construction.

Referring now to FIG. 15, it has been found in some automobiles having large vinyl heel pads sewn into the automotive carpet proximate the accelerator that if bristles are provided over the vinyl heel pad, slippage could occur. FIG. 15 shows a floor mat made according to the present invention, and having the lower bristled surface removed from the area enclosed by the phantom line 60, which has been found to solve the slippage problem. Thus, by providing a novel carpet construction not having a bonding layer, and using the same in connection with the retainer covering the entire bottom area of a floor mat construction, I have provided a novel floor mat construction of substantially lighter weight and less manufacturing expense than previously available.

I claim:
1. A floor mat construction including:
    (a) carpeting having nap on at least one side thereof;
    (b) a separate retainer of substantially the same size as said carpet, said retainer having at least a single planar surface and a lower bristled surface depending downwardly therefrom; and
    (c) fastening means to secure said carpet to said separate retainer.
2. The construction defined in claim 1, wherein:
    (a) said lower bristled surface depends downwardly from said planar surface except proximate said fastening means.
3. The construction defined in claim 2, wherein:
    (a) said retainer has at least one mass reduction opening therein.
4. The construction defined in claim 3, wherein:
    (a) the bristles forming said lower bristled surface cover from ⅓ to one hundred percent of the area of said retainer.
5. The construction defined in claim 4, wherein the length of said bristles is no more than ¾ of the average length of the automotive carpet on which said floor mat is used.
6. The construction defined in claim 5, wherein said fastening means includes:
    (a) an edge binding securing said retainer to said carpeting
7. The construction defined in claim 6, wherein said carpeting comprises:
    (a) a scrim layer,
    (b) a plurality of loops tufted into said scrim layer; and
    (c) a bonding layer securing said loops to said scrim layer.
8. The construction defined in claim 7, whrein said retainer includes:
    (a) a toe portion; and
    (b) a heel portion
9. The construction defined in claim 8, wherein:
    (a) said toe portion includes a first planar surface; and
    (b) said heel portion includes a second planar surface joined to said first planar surface about a toe line.
10. The construction defined in claim 9, wherein and said heel portion of said retainer has a saw tooth portion formed proximate the front thereof proximate said toe line.
11. The construction defined in claim 10, wherein:

(a) said lower bristled surface depends downwardly from said planar surface and said second planar surface except proximate said first fastening means and said saw tooth portion.

12. The construction defined in claim 11, wherein said fastening means include stitching securing said edge binding to said carpeting and said retainer.

13. The construction defined in claim 11, wherein said fastening means include a heat seal securing said edge binding to said carpeting and said retainer.

14. The construction defined in claim 13, wherein said fastening means include rivets securing said edge binding to said carpeting and said retainer.

15. The construction defined in any one of claim 12-14, wherein said bristles are absent from said lower bristled surface where said lower bristled surface is to contact a heel pad of an automotive carpet.

16. The construction defined in any one of claims 12-14, wherein the bristles forming siad lower bristled surface are formed in a manner to provide a taper to at least part of said lower bristled surface.

17. The construction defined in claim 5, wherein said fastening means includ:
    (a) an upstanding lip formed integrally with said the retainer around at least a portion of the perimeter thereof to be bent over upon said carpeting.

18. The construction defined in claim 17, wherein said upstanding lip includes a plurality of forming braks to aid in bending said upstanding lip over said carpet.

19. The construction defined in claim 18, wherein said carpeting comprises:
    (a) a scrim layer,
    (b) a plurality of loops tufted into said scrim layer; and
    (c) a bonding layer securing said loops to said scrim layer.

20. The construction defined in claim 19, wherein said retainer includes:
    (a) a toe portion; and
    (b) a heel portion 21. The construction defined in claim 20, wherein:
    (a) said toe portion includes a first planar surface; and
    (b) said heel portion includes a second planar surface joined to said first planar surface about a toe line.

22. The construction defined in claim 21, wherein said heel portion of said retainer has a saw tooth portion formed proximate the front thereof proximate said toe line.

23. The construction defined in claim 22, wherein:
    (a) said lower bristled surface depends downwardly from said first planar surface and said second planar surface except proximate said fastening means and said saw tooth portion.

24. The construction defined in claim 23, wherein said fastening means include stitching securing said lip to said carpeting and said retainer.

25. The construction defined in claim 24, wherein said fastening means include a heat seal securing said lip to said carpeting and said retainer.

26. The construction defined in claim 23, wherein said fastening means include rivets securing said lip to said carpeting and said retainer.

27. The construction defined in claim 26, wherein said bristles are absent from said lower bristled surface where said lower bristled surface is to contact a heel pad of an automotive carpet.

28. The construction defined in any one of claims 24-27, wherein the bristles forming said lower bristled surface are formed in a manner to provide a taper to at least part of said lower bristled surface.

29. A floor mat construction including:
    (a) carpeting having nap on at least one side thereof; and
    (b) a separate lipped retainer of substantially the same size as said carpet, said retainer including at least a single planar surface and a lower bristled surfce depending downwardly from said single planar surface; and
    (c) fastening means to secure said carpeting to said separate lipped retainer.

30. The construction defined in claim 29, wherein said fastening means include bending the lip of said lipped retainer over the edge of said carpeting.

31. A retainer adapted to accept and retain a piece of carpeting and thereby became a floor mat with retainer including;
    (a) a single planar surface capable of receiving a piece of carpet on the topside thereof, and having a plurality of bristles depending downwardly from the underside thereof; and
    (b) carpeting having nap on at least on side thereof; and
    (c) fastening means securing said carpeting to said retainer.

32. The retainer defined in claim 31, said fastening means further including:
    (a) a lip depending upwardly from the topside of said planar surface and extending around at least a portion of the periphery of said retainer to accept and retain said carpet.

33. The construction defined in claim 31, wherein said fastening means includes an edge binding.

34. The construction defined in any of claims 32-33, wherein the length of said bristles is no more than ¾ of the average length of the automotive carpet on which said retainer is to be used.

35. The construction defined in claim 34, wherein the carpeting attached to said retainer comprises:
    (a) a scrim layer,
    (b) a plurality of loops tufted in said scrim layer; and
    (c) a bonding layer securing said loops to said scrim.

* * * * *